US012632104B2

(12) United States Patent (10) Patent No.: US 12,632,104 B2
Wolford (45) Date of Patent: May 19, 2026

(54) OPERATING A VOLTAGE REGULATOR AT PEAK EFFICIENCY

(71) Applicant: LENOVO ENTERPRISE SOLUTIONS (SINGAPORE) PTE LTD., Singapore (SG)

(72) Inventor: Robert R. Wolford, Strongsville, OH (US)

(73) Assignee: LENOVO ENTERPRISE SOLUTIONS (SINGAPORE) PTE LTD., Singapore (SG)

( * ) Notice: Subject to any disclaimer, the term of this patent is extended or adjusted under 35 U.S.C. 154(b) by 156 days.

(21) Appl. No.: 18/193,824

(22) Filed: Mar. 31, 2023

(65) Prior Publication Data

US 2024/0329724 A1 Oct. 3, 2024

(51) Int. Cl.
*G06F 1/00* (2006.01)
*G06F 1/3296* (2019.01)

(52) U.S. Cl.
CPC .................................. *G06F 1/3296* (2013.01)

(58) Field of Classification Search
CPC ..................................................... G06F 1/3296
See application file for complete search history.

(56) References Cited

U.S. PATENT DOCUMENTS

| 2013/0197895 A1* | 8/2013 | Wang | G06F 1/3203 |
| | | | 703/21 |
| 2019/0050047 A1* | 2/2019 | Wolford | G06F 1/3237 |
| 2019/0272012 A1* | 9/2019 | Kachare | G06F 1/3221 |
| 2023/0129548 A1* | 4/2023 | Mukherjee | G06F 9/5077 |
| | | | 718/104 |
| 2023/0297431 A1* | 9/2023 | Cudak | G06F 9/5094 |
| | | | 718/104 |

* cited by examiner

*Primary Examiner* — Mohammed H Rehman

(57) ABSTRACT

Methods, systems, and products for operating a VRD at peak efficiency includes: generating, during operation of a computing system that includes a VRD providing power to a processor, an efficiency histogram for the VRD, identifying, from the efficiency histogram, a power output level associated with the VRD operating at peak power efficiency, and setting a power cap for the processor at the power output level.

20 Claims, 5 Drawing Sheets

OPERATING A VOLTAGE REGULATOR AT PEAK EFFICIENCY

BACKGROUND

Field of the Disclosure

The field of the disclosure is data processing, or, more specifically, methods, apparatus, and systems for operating a VRD (voltage regulator device) at peak efficiency.

Description of Related Art

The operating efficiency of VRDs changes with respect to different loads placed on the VRD. Typically, the efficiency curve for a VRD is a bell curve, where the VRD experiences diminishing returns when operating beyond the VRD's peak efficiency point. It can be advantageous to increase the overall efficiency of the VRD.

SUMMARY

Methods and systems for operating a VRD at peak efficiency according to various embodiments are disclosed in this specification. In accordance with one aspect of the present disclosure, a method of operating a VRD at peak efficiency may include generating, during operation of a computing system that includes a VRD providing power to a processor, an efficiency histogram for the VRD, identifying, from the efficiency histogram, a power output level associated with the VRD operating at peak power efficiency, and setting a power cap for the processor at the power output level.

In accordance with another aspect of the present disclosure, operating a VRD at peak efficiency may include a system including: a processor, a VRD providing power to the processor, and a BMC (baseboard management controller) configured to: generate, during operation of the system, an efficiency histogram for the VRD, identify, from the efficiency histogram, a power output level associated with the VRD operating at peak power efficiency, and set a power cap for the processor at the power output level.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
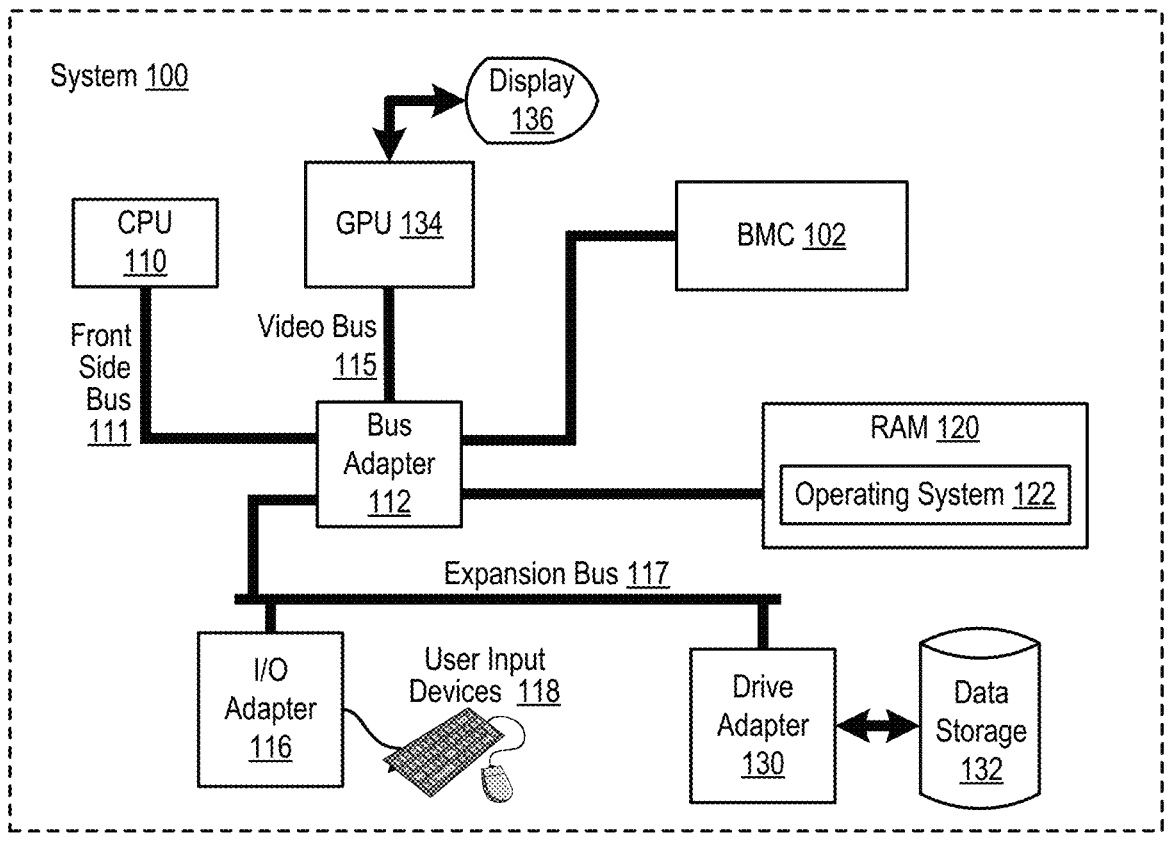
FIG. 1 shows an example line drawing of a system configured for operating a VRD at peak efficiency in accordance with embodiments of the present disclosure.

Exemplary methods, systems, and products for operating a VRD at peak efficiency in accordance with the present disclosure are described with reference to the accompanying drawings, beginning with FIG. 1. FIG. 1 sets forth an example system configured for operating a VRD at peak efficiency in accordance with embodiments of the present disclosure. The example system 100 of FIG. 1 includes multiple processors, such as a CPU (central processing unit) 110, a GPU 134 (graphics processing unit), and others not depicted in FIG. 1. The example system 100 may also include RAM (random access memory) 120 which is connected through a high speed memory bus and bus adapter 112 to CPU 110 and to other components of the system 100.

Stored in RAM 120 is an operating system 122. Operating systems useful in computers configured for operating a VRD at peak efficiency according to embodiments of the present disclosure include UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive.

The system 100 of FIG. 1 includes disk drive adapter 130 coupled through expansion bus 117 and bus adapter 112 to CPU 110 and other components of the system 100. Disk drive adapter 130 connects non-volatile data storage to the system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, Flash drive, electrically erasable programmable read-only memory ('EEPROM'), RAM drives, and so on, as will occur to those of skill in the art.

The example system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example system 100 of FIG. 1 includes a GPU 134, which is an example of an I/O adapter specially designed for graphic output to a display device 136 such as a display screen or computer monitor. GPU 134 is connected to CPU 110 through a high speed video bus 115, bus adapter 112, and the front side bus 111, which is also a high speed bus.

In the example system 100 of FIG. 1, there may be included a VRD (not shown) for one or more of the components, such as CPU 110, GPU 134, a PCIe card, and the like. A VRD is designed to accept an input voltage, such as from a power supply, and maintain a constant output voltage to provide regulated voltage to other computing components, such as CPUs, GPUs, and the like. VRDs may also change the output voltage relative to the input voltage, such as stepping up or down the voltage. For example, during operation of system 100, a VRD corresponding to GPU 134 may provide constant regulated voltage to GPU 134, independent of fluctuations in the input voltage of the VRD.

In the example system 100 of FIG. 1, the BMC 102 includes firmware and memory and is configured to monitor and manage various components of the system 100. The BMC 102 may be configured generate, during operation of system 100, an efficiency histogram for one or more VRDs providing power to the one or more processors of system 100. The BMC 102 may also be configured to identify, from the generated efficiency histogram, a power output level associated with the one or more VRDs operating at peak power efficiency. That is, the BMC may identify the output of the VRD at the point when the VRD is most efficient with respect to the load on the VRD. The BMC 102 may also be configured to set a power cap for the one or more processors of system 100 at the identified power output level. That is, the BMC may prevent the processor from placing a load on the VRD that is higher than the identified power output level associated with the VRD operating at peak power efficiency, thereby allowing the VRD to continue operating at the VRD's peak efficiency point.

Figure 2:
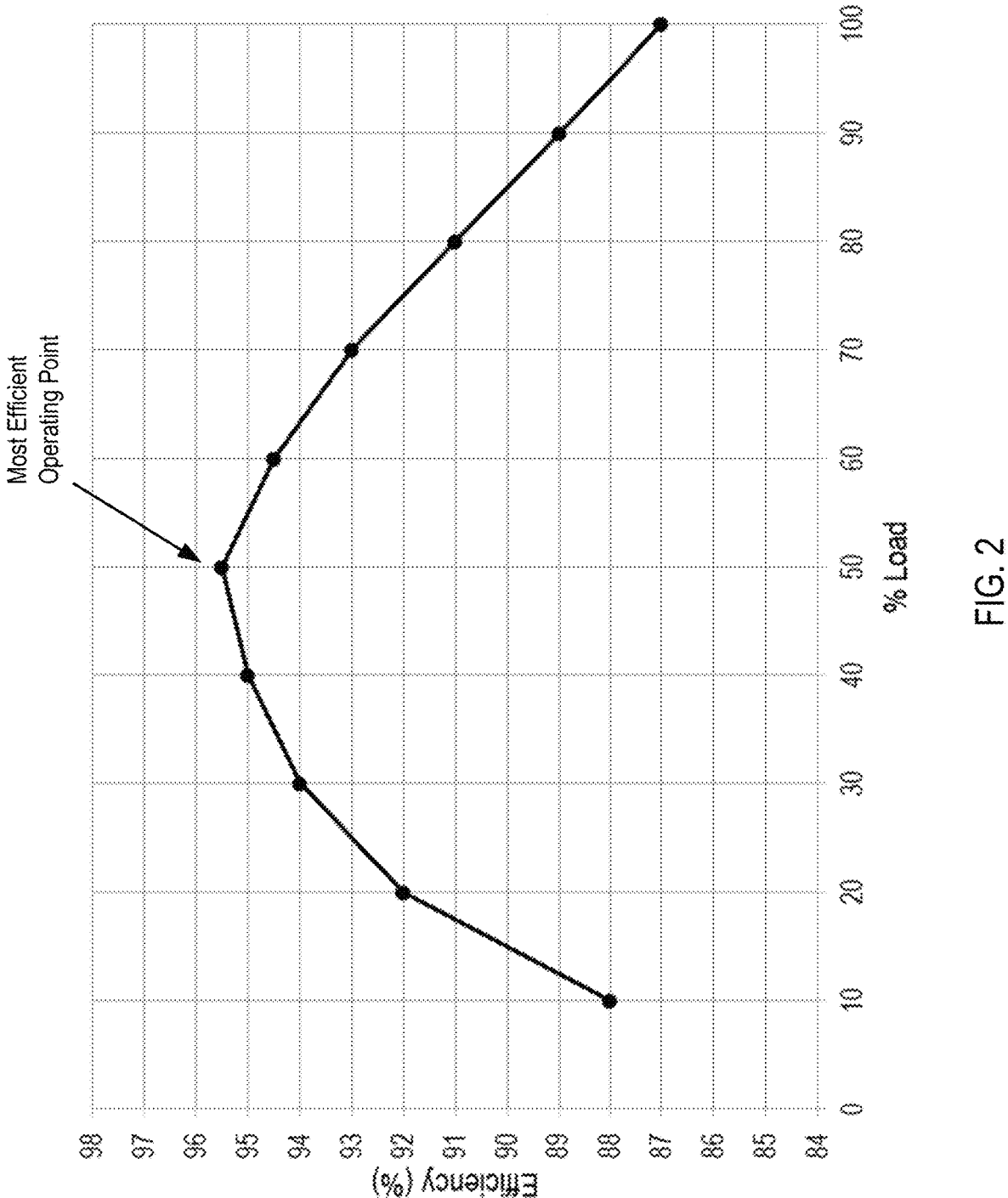
FIG. 2 shows an example chart of an efficiency histogram for a VRD in accordance with embodiments of the present disclosure.

For further explanation, FIG. 2 sets forth an example efficiency histogram for a VRD in accordance with embodiments of the present disclosure. Such an efficiency histogram may be generated by the BMC 102 in real time during operation of the system 100. The BMC is configured to receive real time input and output levels for the one or more VRDs in system 100 and may generate an efficiency histogram by calculating the power efficiency using the known 'power in' and 'power out' values. The example BMC may be configured to identify, from the histogram, the point at which the VRD is operating at peak efficiency or a 'most efficient operating point' in FIG. 2. For example, the BMC may determine, from the histogram, the power output level, or percent load, on the VRD at the identified peak efficiency point. The BMC may be configured to set, for the processor being delivered power by the VRD, a power cap at the determined power output level associated with the VRD operating at the peak efficiency point. Setting a power cap for the processor to not exceed the determined percent load for the VRD causes the VRD to not operate beyond the VRD's peak efficiency point, thereby increasing the overall efficiency of the VRD. Increasing the overall efficiency of the VRD reduces excess power draw by the system, increases battery life, reduces generated heat, and other benefits that may be recognized by those skilled in the art. The points, or dots, on the histogram in FIG. 2 may each be a different P-state (or performance state) at which the processor operates at, where each successive P-state for the processor requires a higher percent load for the VRD. That is, the processor operates at multiple discrete frequencies respective to the multiple P-states. Generally, P0 is the highest-performance state, and thereby draws the most power, with P1 to Pn being successively lower-performance states. Processors may also support C-states (or power states) or D-states (device states), where C0 and D0 are respectively the operating states where the processor may operate in any of the P-states. That is, when active, a processor operates in any of the processor's configured P-states.

Figure 3:
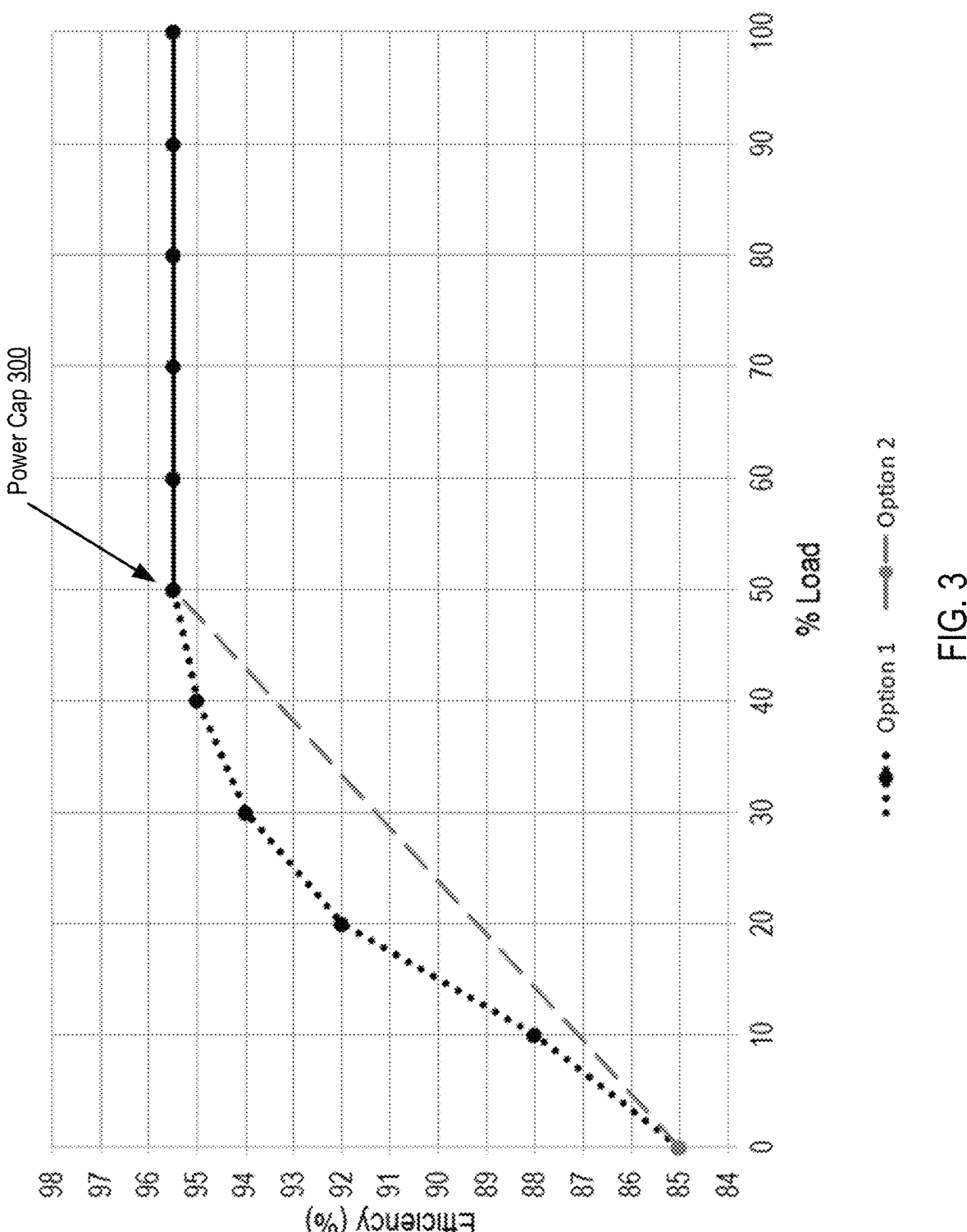
FIG. 3 shows an example chart of an efficiency histogram for a VRD in accordance with embodiments of the present disclosure.

For further explanation, FIG. 3 sets forth an example efficiency histogram for a VRD in accordance with embodiments of the present disclosure. The example histogram of FIG. 3 shows the power efficiency of a VRD when a power cap is set, for the processor receiving power from the VRD, at the determine power output level associated with the VRD operating at the VRD's peak efficiency point. For example, in the generated histogram of FIG. 2, the 'most efficient operating point' for the VRD is at 50% load, having a peak operating efficiency of 95.5%. In the histogram of FIG. 3, a power cap 300 has been set on the processor to prevent the processor from drawing greater than a 50% load on the VRD, thereby maintaining peak efficiency for the VRD as the processor is active. Not shown in FIG. 3 is the percent load on the VRD dropping back down below the peak efficiency point, such as when the processor finishes a workload and goes back to an idle state. In the example histogram of FIG. 3, the power cap 300 may be set by the BMC 102 by setting a maximum allowed P-state that is associated with the power output (such as 50% load in FIG. 3). That is, the BMC may instruct the processor not to exceed a P-state past an identified P-state corresponding to the determined output level associated with the VRD operating at peak efficiency, according to a generated histogram. The maximum allowed P-state may be less than a maximum P-state (or the highest-performance P-state, such as P0) supported by the processor. In setting a maximum allowed P-state for the processor, the BMC sets a power cap for the processor by preventing the processor from operating at any P-state that is a higher-performance P-state (which would require more power than the set power cap) relative to the maximum allowed P-state. The power cap set by the BMC may be a self-learning power cap. In another embodiment, the power cap may be set by some other method, such as by utilizing a power cap mechanism built into the processor for controlling the amount of power the processor may draw. For example, the processor may include a mechanism to set a power cap relative to the natural power limit (or TDP) of the processor.

In the example histogram of FIG. 3, there are two options shown for getting to the power cap 300. 'Option 1' in FIG. 3, shown as the dotted line, depicts the processor naturally moving through multiple different P-states before reaching the maximum allowed P-state at power cap 300. That is, the processor has the option, such as option 1 shown in FIG. 3, to operate as normal until reaching the power cap, such as by increasing the percent load on the VRD gradually until hitting the power cap 300, which prevents the processor from drawing a higher percent load from the VRD. 'Option 2' in FIG. 3, shown as the dashed line, depicts the processor skipping from the processor's lowest-performance P-state (at 0% load) to the maximum allowed P-state (at 50% load) corresponding to the power cap 300. That is, when active, the processor may be configured to skip to the determined power output level associated with the VRD operating at the peak efficiency point. A processor operating under option 2 may be configured to apply hysteresis when switching from the lowest-performance P-state to the maximum allowed P-state, so as to prevent rapid switching between states when executing transient workloads. That is, the processor may be configured to wait a predetermined amount of time before switching between P-states when operating under 'option 2' as shown in FIG. 3.

In the example of FIG. 3, the BMC 102 may be configured to determine when to switch between option 1 and option 2. For example, the BMC may instruct the processor to switch from option 1 to option 2 based on characteristics of a workload executing on the processor, such as workload size, workload type (such as steady-state or transient), and the like. Not shown in FIG. 3, there may be additional options for how the processor operates, such as skipping to the maximum allowed P-state after naturally going through 1 or 2 or some other number of P-states. For example, the BMC may be configured to instruct the processor to skip to the maximum allowed P-state after naturally going through 3 P-states.

Figure 4:
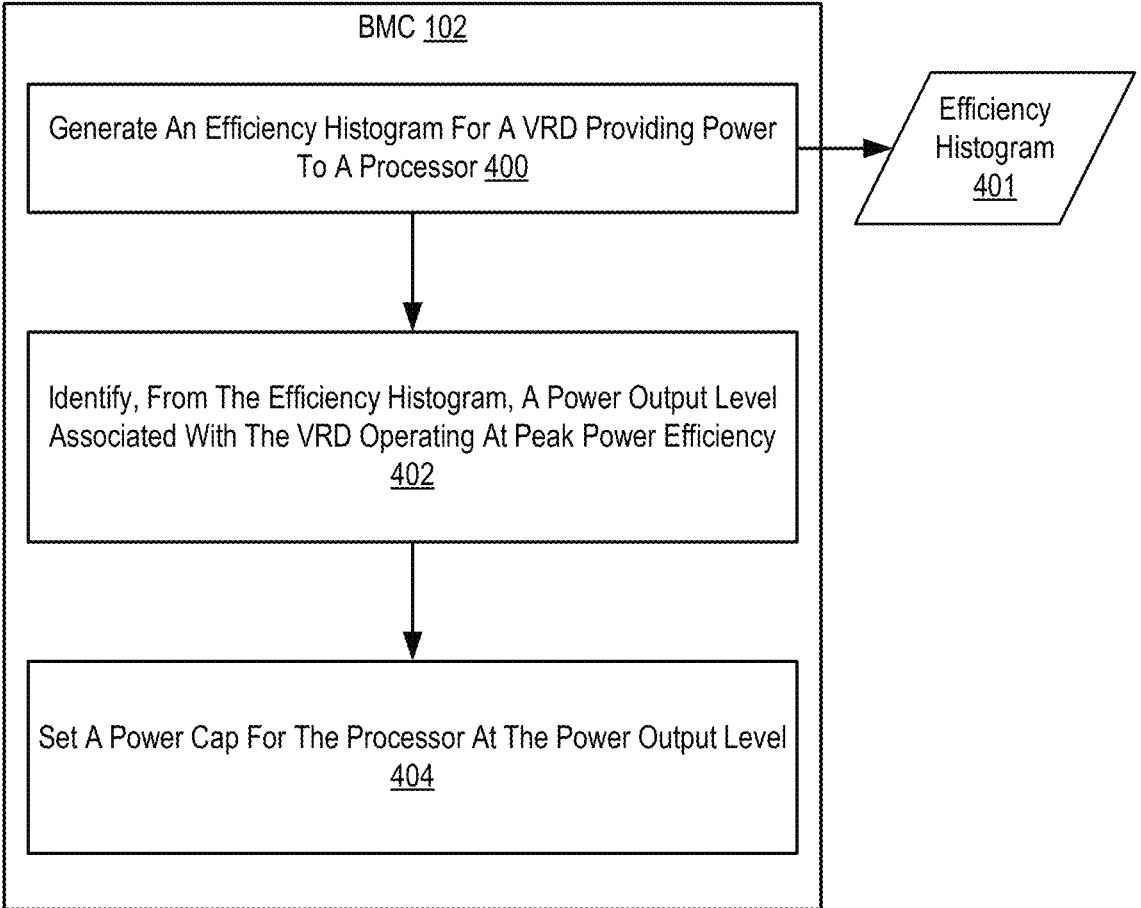
FIG. 4 is a flowchart of an example method for operating a VRD at peak efficiency according to some embodiments of the present disclosure.

For further explanation, FIG. 4 sets forth a flow chart illustrating an exemplary method of operating a VRD at peak efficiency according to embodiments of the present disclosure. The method of FIG. 4 includes generating 400 an efficiency histogram 401 for a VRD providing power to a processor. The processor may include any type of processor within the computing system, such as a CPU, a GPU, a hardware accelerator (such as ASICs or 'application-specific integrated circuits.' FPGAs or 'field-programmable gate arrays,' and the like), a PCIe card, and the like. The efficiency histogram 401 may be one that is similar to the histogram shown in FIG. 2. Generating 400 an efficiency histogram may be carried out by the BMC 102 calculating the power efficiency in real time using known 'power in' and 'power out' values for the VRD, which are received by the BMC in real time during operation. For example, the BMC may be configured to monitor the VRD corresponding to a processor in system 100 and determine real-time 'power in' and 'power out' values for the VRD, which may then be used to calculate power efficiency for the VRD and generate the efficiency histogram. The histogram generated by the BMC may be in various forms, such as a graph (as in FIG. 2), a table of data points, parameter values to fit a formula to the curve, and the like.

The method of FIG. 4 also includes identifying 402, from the efficiency histogram 401, a power output level associated with the VRD operating at peak power efficiency. Identifying 402 a power output level associated with the VRD operating at peak power efficiency may be carried out by the BMC 102 identifying, from the histogram, the point at which the VRD is operating at peak efficiency and then determining, from the histogram, the power output level, or percent load, for the VRD at the identified peak efficiency point. That is, the BMC may identify the output of the VRD at the point when the VRD is most efficient with respect to the load on the VRD.

The method of FIG. 4 also includes setting 404 a power cap for the processor at the power output level. Setting 404 a power cap for the processor at the power output level may be carried out by the BMC 102 instructing the processor to not exceed the determined percent load for the VRD associated with the peak efficiency point of the VRD. Setting a power cap for the processor to not exceed the determined percent load for the VRD causes the VRD to not go beyond the VRD's peak efficiency point, thereby increasing the overall efficiency of the VRD. Increasing the overall efficiency of the VRD reduces excess power draw by the system, increases battery life, reduces generated heat, and other benefits that may be recognized by those skilled in the art.

Figure 5:
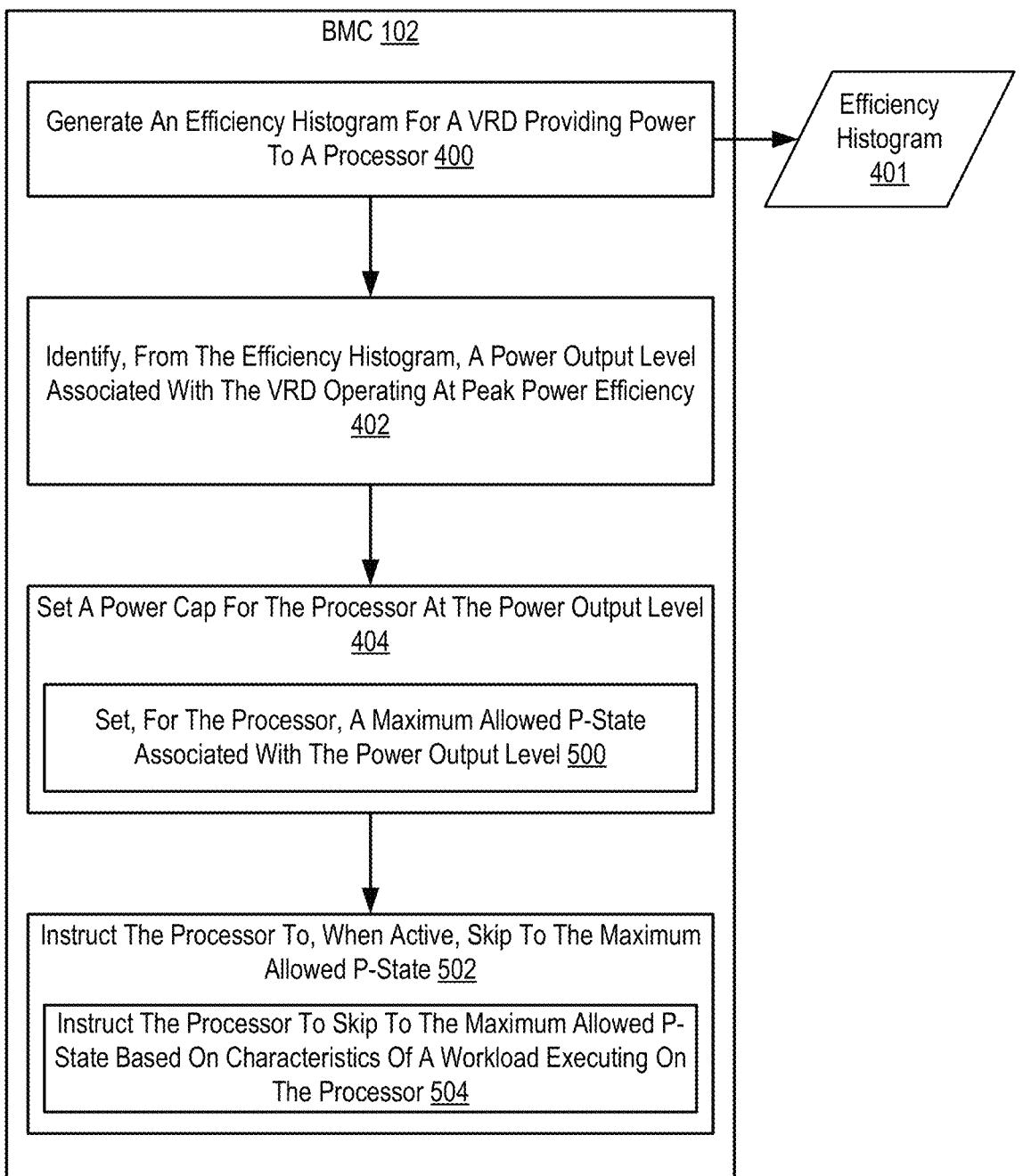
FIG. 5 is a flowchart of an example method for operating a VRD at peak efficiency according to some embodiments of the present disclosure.

For further explanation, FIG. 5 sets forth a flowchart illustrating an example method of operating a VRD at peak efficiency according to embodiments of the present disclosure. The method of FIG. 5 continues with the method of FIG. 4 by further including, as part of setting 404 a power cap for the processor at the power output level, setting 500, for the processor, a maximum allowed P-state associated with the power output level. Setting 500, for the processor, a maximum allowed P-state associated with the power output level may be carried out by the BMC 102 instructing the processor not to exceed a P-state past an identified P-state corresponding to the determined output level associated with the VRD operating at peak efficiency, according to a generated histogram.

The method of FIG. 5 also includes instructing 502 the processor to, when active, skip to the maximum allowed P-state. Instructing 502 the processor to, when active, skip to the maximum allowed P-state may be carried out by the BMC instructing the processor to skip to the identified P-state corresponding to the determined output level associated with the VRD operating at peak efficiency, according to a generated histogram. That is, rather than naturally moving through multiple different P-states before reaching the maximum allowed P-state at the set power cap, the processor may be instructed to, whenever the processor is active (such as at C0 or D0) skip directly to the maximum allowed P-state associated with the power cap.

The method of FIG. 5 also includes, as part of instructing 502 the processor to skip to the maximum allowed P-state, instructing 504 the processor to skip to the maximum allowed P-state based on characteristics of a workload executing on the processor. Instructing 504 the processor to skip to the maximum allowed P-state may be carried out by the BMC 102 based on characteristics of a workload executing on the processor, such as workload size, workload type (such as steady-state or transient), and the like. For example, the BMC may instruct the processor to, when active, skip to the maximum allowed P-state whenever the processor is executing steady-state workloads.

In view of the explanations set forth above, readers will recognize that the benefits of operating a VRD at peak efficiency according to embodiments of the present disclosure include:

Reducing the amount of heat generated by the VRD from inefficient operation.

Increasing overall VRD efficiency, thereby increasing battery life and decreasing wasted energy by the computing system.

The flowchart and block diagrams in the Figures illustrate the architecture, functionality, and operation of possible implementations of systems, methods, and apparatus according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments of the present disclosure are described largely in the context of a fully functional computer system for dynamic buffer selection in ethernet controllers. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of controlling voltage regulator efficiency, the method comprising:
   generating, during operation of a computing system that includes a VRD (voltage regulator device) providing power to a processor, an efficiency histogram for the VRD;
   identifying, from the efficiency histogram, a power output level associated with the VRD operating at peak power efficiency; and
   setting a power cap for the processor at the power output level.

2. The method of claim 1, wherein setting the power cap for the processor includes setting, for the processor, a maximum allowed P-state associated with the power output level.

3. The method of claim 2, wherein the maximum allowed P-state is less than a maximum P-state supported by the processor.

4. The method of claim 2, wherein the processor, during execution, operates at a plurality of P-states without exceeding the maximum allowed P-state.

5. The method of claim 2, further comprising:
   instructing the processor to, when active, skip to the maximum allowed P-state.

6. The method of claim 5, wherein instructing the processor to skip to the maximum allowed P-state further comprises instructing the processor to skip to the maximum allowed P-state based on characteristics of a workload executing on the processor.

7. The method of claim 1, wherein the processor comprises a CPU (central processing unit).

8. The method of claim 1, wherein the processor comprises a GPU (graphics processing unit).

9. The method of claim 1, wherein the processor comprises a hardware accelerator, and wherein the power cap set is specific to the processor.

10. A system for controlling voltage regulator efficiency, the system comprising:
   a processor;
   a VRD (voltage regulator device) providing power to the processor; and
   a BMC (baseboard management controller) configured to:

generate, during operation of the system, an efficiency histogram for the VRD;
   identify, from the efficiency histogram, a power output level associated with the VRD operating at peak power efficiency; and
   set a power cap for the processor at the power output level.

11. The system of claim 10, wherein setting the power cap for the processor includes setting, for the processor, a maximum allowed P-state associated with the power output level.

12. The system of claim 11, wherein the maximum allowed P-state is less than a maximum P-state supported by the processor.

13. The system of claim 11, wherein the processor, during execution, operates at a plurality of P-states without exceeding the maximum allowed P-state.

14. The system of claim 11, further comprising:
   instructing the processor to, when active, skip to the maximum allowed P-state.

15. The system of claim 14, wherein instructing the processor to skip to the maximum allowed P-state further comprises instructing the processor to skip to the maximum allowed P-state based on characteristics of a workload executing on the processor.

16. The system of claim 10, wherein the processor comprises a CPU (central processing unit).

17. A computer program product for controlling voltage regulator efficiency, the computer program product comprising a non-volatile computer readable medium and computer program instructions stored therein that are configured to, when executed, cause a computer to perform operations comprising:
   generating, during operation of a computing system that includes a VRD (voltage regulator device) providing power to a processor, an efficiency histogram for the VRD;
   identifying, from the efficiency histogram, a power output level associated with the VRD operating at peak power efficiency; and
   setting a power cap for the processor at the power output level.

18. The computer program product of claim 17, wherein setting the power cap for the processor includes setting, for the processor, a maximum allowed P-state associated with the power output level.

19. The computer program product of claim 18, further comprising:
   instructing the processor to, when active, skip to the maximum allowed P-state.

20. The computer program product of claim 19, wherein instructing the processor to skip to the maximum allowed P-state further comprises instructing the processor to skip to the maximum allowed P-state based on characteristics of a workload executing on the processor.

\* \* \* \* \*